US012789445B2

(12) United States Patent
Kim et al.

(10) Patent No.: US 12,789,445 B2
(45) Date of Patent: Nov. 10, 2026

(54) POUCH MOLDING APPARATUS

(71) Applicant: LG Energy Solution, Ltd., Seoul (KR)

(72) Inventors: Shin Chul Kim, Daejeon (KR); Sung Chul Park, Daejeon (KR); Byung Kwan Ko, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 350 days.

(21) Appl. No.: 18/563,730

(22) PCT Filed: Oct. 25, 2022

(86) PCT No.: PCT/KR2022/016342
§ 371 (c)(1),
(2) Date: Nov. 22, 2023

(87) PCT Pub. No.: WO2023/075359
PCT Pub. Date: May 4, 2023

(65) Prior Publication Data

US 2024/0217162 A1 Jul. 4, 2024

(30) Foreign Application Priority Data

Oct. 27, 2021 (KR) ........................ 10-2021-0145041

(51) Int. Cl.
*B29C 51/30* (2006.01)
*B29C 51/08* (2006.01)
(Continued)

(52) U.S. Cl.
CPC ............ *B29C 51/30* (2013.01); *B29C 51/082* (2013.01); *H01M 10/0404* (2013.01); *H01M 50/105* (2021.01); *B29L 2031/3468* (2013.01)

(58) Field of Classification Search
CPC ............................ B29C 51/30; B29C 51/082; B29L 2031/3468
(Continued)

(56) References Cited

U.S. PATENT DOCUMENTS

2013/0001123 A1 1/2013 Greenland
2014/0183085 A1 7/2014 Greenland
(Continued)

FOREIGN PATENT DOCUMENTS

CN 101259498 B 3/2012
CN 107068946 A 8/2017
(Continued)

OTHER PUBLICATIONS

Search report from International Application No. PCT/KR2022/016342, mailed Jan. 30, 2023.
(Continued)

*Primary Examiner* — Christina A Johnson
*Assistant Examiner* — Xue H Liu
(74) *Attorney, Agent, or Firm* — Lerner David LLP

(57) ABSTRACT

A pouch molding apparatus includes a die plate, a first stripper, a punch part, and a second stripper. The die plate has a flat plate shape so that a pouch film is seated on an upper portion thereof and has a molding hole having a shape passing through top and bottom surfaces of the die plate. The first stripper is configured to press and fix the pouch film to an upper side of the die plate and has a punch hole at a position at a position corresponding to the molding hole. The punch part is drawn in and out of the punch hole of the first stripper and the molding hole of the die plate to mold the pouch film. The second stripper protrudes from a bottom surface of the first stripper along a circumference of the punch hole in order to press and fix the pouch film.

17 Claims, 10 Drawing Sheets

(51) Int. Cl.
*H01M 10/04* (2006.01)
*H01M 50/105* (2021.01)
*B29L 31/34* (2006.01)

(58) Field of Classification Search
USPC .......................................................... 425/398
See application file for complete search history.

(56) References Cited

U.S. PATENT DOCUMENTS

| | | | |
|---|---|---|---|
| 2014/0260495 A1 | 9/2014 | Kohno et al. | |
| 2018/0205107 A1 | 7/2018 | Lee et al. | |
| 2019/0366654 A1 | 12/2019 | Ueno et al. | |
| 2020/0168853 A1 | 5/2020 | Kim et al. | |
| 2020/0282627 A1 | 9/2020 | Kim et al. | |
| 2022/0143670 A1 | 5/2022 | Ahn et al. | |
| 2023/0321709 A1* | 10/2023 | Lee | B21D 22/02 72/344 |

FOREIGN PATENT DOCUMENTS

| | | | |
|---|---|---|---|
| CN | 109911326 | A | 6/2019 |
| JP | 2002178046 | A | 6/2002 |
| JP | 2014223661 | A | 12/2014 |
| JP | 2015508048 | A | 3/2015 |
| JP | 6237776 | B2 | 11/2017 |
| JP | 6680397 | B1 | 4/2020 |
| JP | 2020087902 | A | 6/2020 |
| JP | 2021061204 | A | 4/2021 |
| KR | 20080082799 | A | 9/2008 |
| KR | 20110032481 | A | 3/2011 |
| KR | 20130132093 | A | 12/2013 |
| KR | 101641933 | B1 | 7/2016 |
| KR | 20180085471 | A | 7/2018 |
| KR | 20180102927 | A | 9/2018 |
| KR | 20180118929 | A | 11/2018 |
| KR | 20180134162 | A | 12/2018 |
| KR | 20190038094 | A | 4/2019 |
| KR | 20200000966 | A | 1/2020 |
| KR | 20200052061 | A | 5/2020 |
| KR | 20200061034 | A | 6/2020 |
| KR | 102176631 | B1 | 11/2020 |
| KR | 102201640 | B1 | 1/2021 |
| KR | 102269614 | B1 | 6/2021 |
| KR | 102296250 | B1 | 9/2021 |
| KR | 102296253 | B1 | 9/2021 |
| WO | 2015045797 | A1 | 4/2015 |

OTHER PUBLICATIONS

Extended European Search Report for Application No. 22887555.5 dated Aug. 7, 2024, pp. 1-5.
Search Report dated Dec. 26, 2025 from the Office Action for Chinese Application No. 202280032984.4 issued Dec. 29, 2025, 3 pages.

* cited by examiner

PRIOR ART (a)

PRIOR ART

POUCH MOLDING APPARATUS

CROSS-REFERENCE TO RELATED APPLICATION

The present application is a national phase entry under 35 U.S.C. § 371 of International Application No. PCT/KR2022/016342 filed on Oct. 25, 2022, which claims priority from Korean Patent Application No. 10-2021-0145041, filed on Oct. 27, 2021, all the disclosures of which are hereby incorporated herein by reference in their entirety.

TECHNICAL FIELD

The present disclosure relates to a pouch molding apparatus, and more particularly, to a pouch molding apparatus, in which a second stripper uniformly and strongly presses a pouch film around a cup part molding position of the pouch film to minimize an occurrence of wrinkles around the cup part, prevent cracks or fractures, which may occur due to the wrinkles, and improve molding quality, thereby achieving space efficiency of the cup part and maximizing energy density.

BACKGROUND ART

A secondary battery refers to a battery that is chargeable and dischargeable, unlike a primary battery that is not charged, and examples of the secondary battery may include a nickel cadmium battery, a nickel hydrogen battery, a lithium ion battery, and a lithium ion polymer battery. Such a secondary battery is being applied to be used in small-sized products such as digital cameras, notebooks, mobile phones, PDAs, E-bikes, and the like as well as large-sized products requiring high power such as electric vehicles and hybrid vehicles, power storage devices for storing surplus power or renewable energy, and backup power storage devices.

Such a secondary battery is classified into a pouch-type secondary battery and a can type secondary battery according to a material of a battery case accommodating an electrode assembly. In the pouch-type secondary battery, the electrode assembly is accommodated in a pouch made of a flexible polymer material having a variable shape. In addition, in the can type secondary battery, an electrode assembly is accommodated in a case made of a metal or plastic material having a predetermined shape.

A pouch, which is a case of the pouch type secondary battery, is manufactured by forming a cup part by performing press processing on a pouch film having flexibility. In addition, when the cup part is formed, an electrode assembly is accommodated in an accommodation space of the cup part, and then, a side of the cup part is sealed to manufacture a secondary battery.

In the press processing, draw-molding is performed by inserting a pouch film into a molding device such as a press equipment and applying a pressure to the pouch film by using a punch to draw the pouch film. The pouch molding apparatus may be divided into a stripper area for fixing the pouch and a punch area. Ideally, after fixing the pouch by applying a uniform surface pressure on the stripper area, the pouch film is molded by applying a pressure through a punch. However, since flatness of a pressing surface on the stripper area is uneven, or surface pressure is applied through the wide pressing surface, the pouch film may not be strongly held around the cup part in which stretching of the pouch film occurs.

FIG. 1 is a view illustrating a state in which wrinkles or cracks occur in a pouch according to the related art. FIG. 2 is a view illustrating a state in which wrinkles are concentrically formed in a cup part according to the related art. As a result, as illustrated in FIGS. 1 and 2, an insertion of the pouch film may non-uniformly occur, and as a result, as illustrated in (a) and (b) of FIG. 1, wrinkles W may occur around a pouch molding part.

Particularly, referring to FIG. 2, the wrinkles are concentrically formed at a corner of the cup part of the pouch in which stretching of the pouch film is concentrated, and the wrinkles may cause cracks (C) due to an impact during movement of logistics (see (c) of FIG. 1), which are directly related to battery performance and safety. Therefore, development of a pouch molding apparatus for solving the above problems is required.

DISCLOSURE OF THE INVENTION

Technical Problem

The present disclosure solves the above problem, and an object of the present disclosure is to provide a pouch molding apparatus, in which a second stripper uniformly and strongly presses a pouch film around a cup part molding position of the pouch film to minimize an occurrence of wrinkles around the cup part, prevent cracks or fractures, which may occur due to the wrinkles, and improve molding quality, thereby achieving space efficiency of the cup part and maximizing energy density.

Technical Solution

A pouch molding apparatus according to the present disclosure may include: a die plate which has a flat plate shape so that a pouch film is seated on an upper portion thereof and in which a cup part molding hole having a shape passing through top and bottom surfaces thereof is formed; a first stripper which is configured to press and fix the pouch film from an upper side of the die plate and in which a punch hole having a shape passing through top and bottom surfaces thereof is formed at a position corresponding to the cup part molding hole; a punch part drawn in and out of the punch hole of the first stripper and the cup part molding hole of the die plate to mold the pouch film; and a second stripper provided to protrude from a bottom surface of the first stripper and provided along a circumference of the punch hole to press and fix the pouch film.

The second stripper may be formed in a ring shape having an inner circumference and an outer circumference, wherein the inner circumference may be greater than a circumference of the punch hole.

In the second stripper, a friction coating layer may be formed on a surface facing the die plate.

The friction coating layer may include silicon.

The first stripper may be formed along a circumference of the punch hole, wherein an insertion hole having a shape that is recessed upward from a lower portion of the first stripper may be formed in the first stripper.

The insertion groove may have a horizontal cross-section having a shape corresponding to that of a horizontal cross-section of the second stripper, and the second stripper may be provided to protrude from a bottom surface of the first stripper, wherein the second stripper is provided to be drawn in or out of the insertion groove so as to be vertically movable.

The pouch molding apparatus may further include: an upper plate provided above the first stripper; and a lower plate provided below the die plate, wherein the upper plate and the lower plate may be coupled to each other at an edge by a coupling member having a length in a vertical direction.

The pouch molding apparatus may further include: a stripper back plate provided between the first stripper and the upper plate to fix at least one of the first stripper or the second stripper; and a die back plate provided between the lower plate and the die plate to support the die plate from a lower side.

The first stripper may be formed along a circumference of the punch hole, wherein a through-hole passing through top and bottom surfaces of the first stripper may be formed in the first stripper, and the second stripper may be fixed to the stripper back plate by a fixing member provided to pass through the through-hole.

The fixing member may be provided in a stopper manner in which a length is changed, but is not changed to a predetermined length or less or the predetermined length or more, but is fixed.

In the second stripper, pouch film pressing force may be adjusted by a pressing force adjusting member provided to pass through the through-hole.

The pressing force adjusting member may include a spring having elasticity in a longitudinal direction.

The pressing force adjusting member may be provided to have one side that is in contact with the second stripper and the other side coupled to the stripper back plate.

The pressing force adjusting member may be provided to have one side that is in contact with the second stripper and the other side coupled to the upper plate.

The punch part may include: a punch body; and a punch which is provided below the punch body and on which a pressing surface configured to press the pouch film is formed.

The first stripper may be formed along a circumference of the punch hole, wherein a through-hole passing through top and bottom surfaces of the first stripper is formed in the first stripper, and the second stripper may be fixed to the upper plate by a fixing member provided to pass through the through-hole.

In the second stripper, pouch film pressing force may be adjusted by a pressing force adjusting member provided to pass through the through-hole, and the pressing force adjusting member may be provided to have one side that is in contact with the second stripper and the other side coupled to the upper plate.

Advantageous Effects

The pouch molding apparatus according to the present disclosure may include the die plate which has the flat plate shape so that the pouch film is seated on the upper portion thereof and in which the cup part molding hole having the shape passing through the top and bottom surfaces thereof is formed, the first stripper which is configured to press and fix the pouch film from the upper side of the die plate and in which the punch hole having the shape passing through the top and bottom surfaces thereof is formed at the position corresponding to the cup part molding hole, the punch part drawn in and out of the punch hole of the first stripper and the cup part molding hole of the die plate to mold the pouch film, and the second stripper provided to protrude from the bottom surface of the first stripper and provided along the circumference of the punch hole to press and fix the pouch film. Therefore, the second stripper may uniformly and strongly press the pouch film around the cup part molding position of the pouch film to minimize the occurrence of the wrinkles around the cup part, prevent the cracks or fractures, which may occur due to the wrinkles, and improve the molding quality, thereby achieving the space efficiency of the cup part and maximizing the energy density.

MODE FOR CARRYING OUT THE INVENTION

Figure 1:
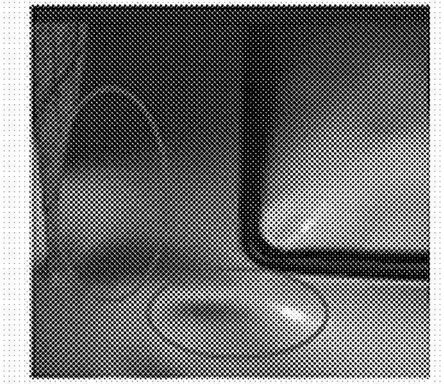
FIG. 1 is a view illustrating a state in which wrinkles or cracks occur in a pouch according to a related art.
Figure 1:
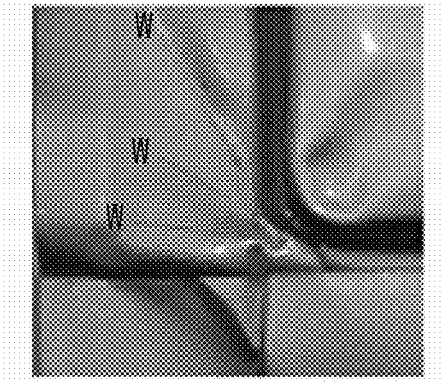
Figure 1:
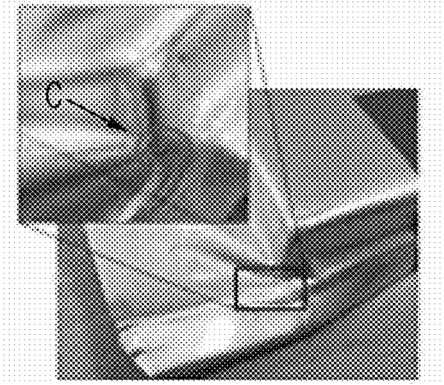
Figure 2:
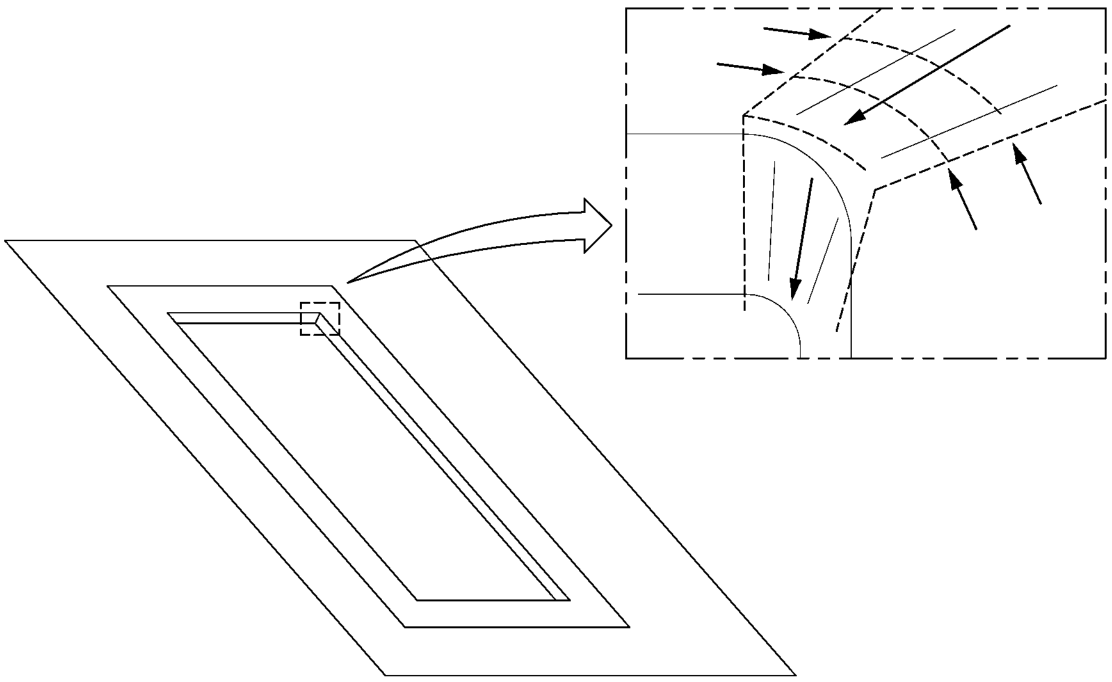
FIG. 2 is a view illustrating a state in which wrinkles are concentrically formed in a cup part according to the related art.

Hereinafter, embodiments of the present invention will be described in detail with reference to the accompanying drawings so that those of ordinary skill in the art can easily carry out the various embodiments of the present invention. However, the present invention may be implemented in several different forms and is not limited or restricted by the following examples.

In order to clearly explain the present disclosure, detailed descriptions of portions that are irrelevant to the description or related known technologies that may unnecessarily obscure the gist of the present disclosure have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present disclosure on the basis of the principle that an inventor can properly define the concept of a term to describe and explain his or her invention in the best ways.

Embodiment 1

Figure 3:
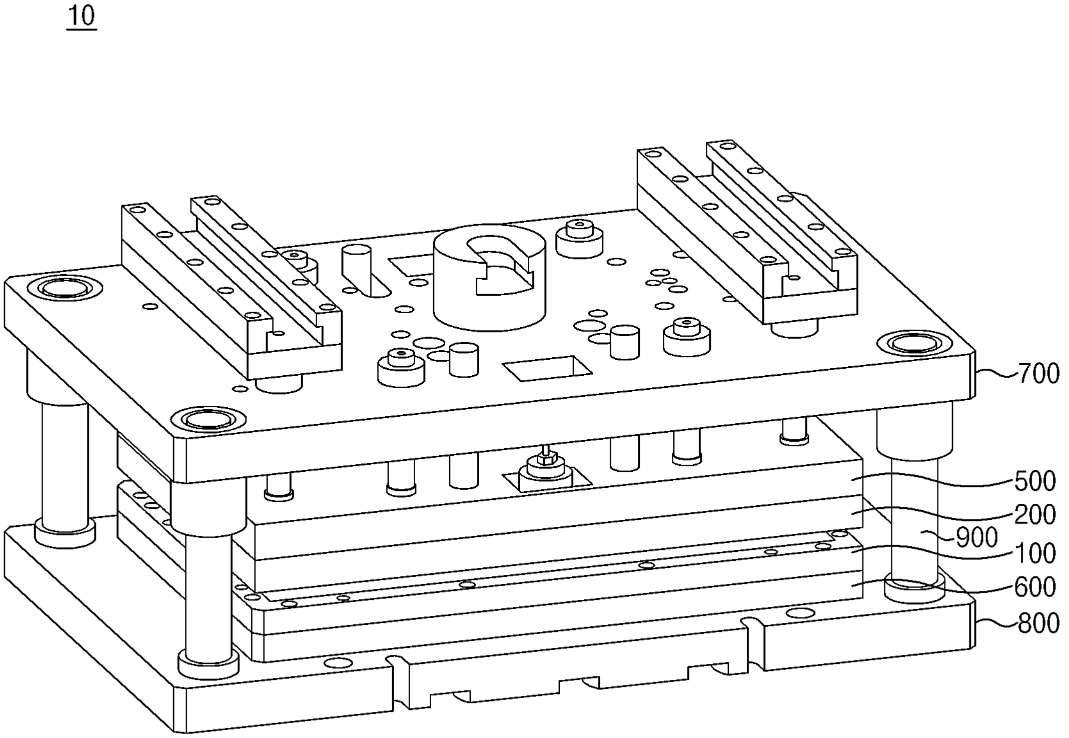
FIG. 3 is a perspective view of a pouch molding apparatus according to Embodiment 1 of the present invention.
Figure 4:
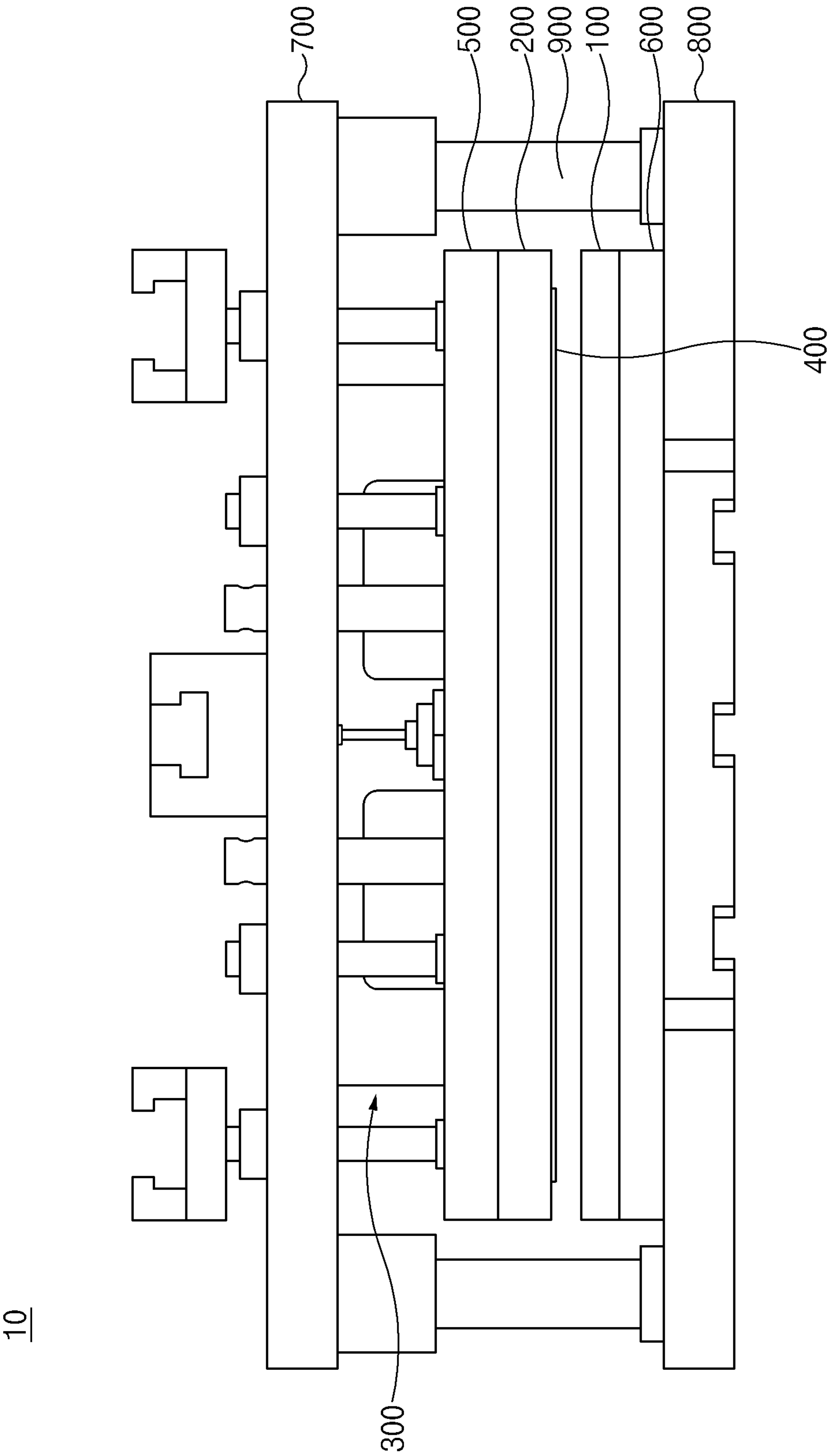
FIG. 4 is a side view of the pouch molding apparatus according to Embodiment 1 of the present invention.
Figure 5:
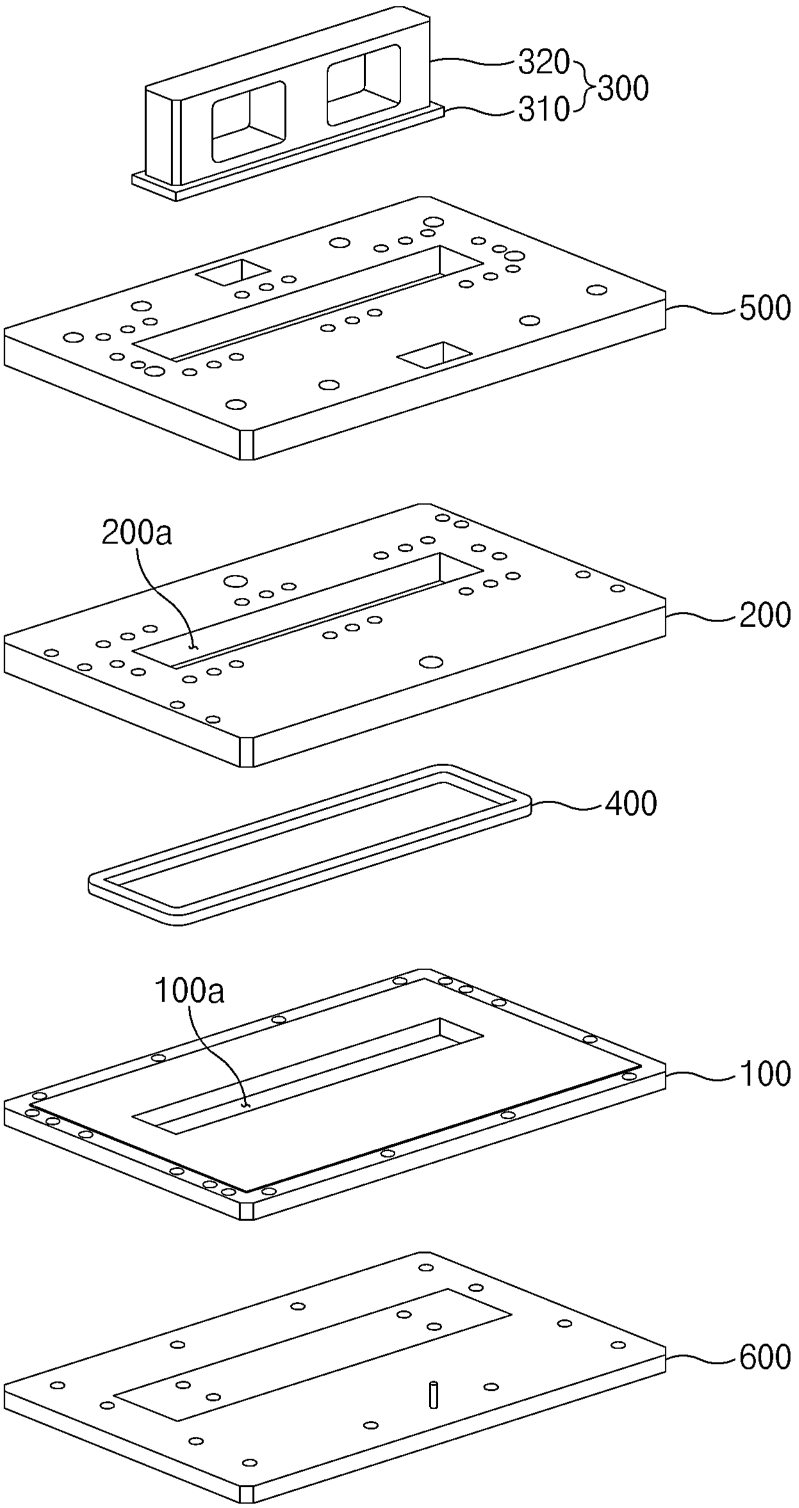
FIG. 5 is an exploded perspective view illustrating some of constituents of the pouch molding apparatus according to Embodiment 1 of the present invention.
Figure 6:
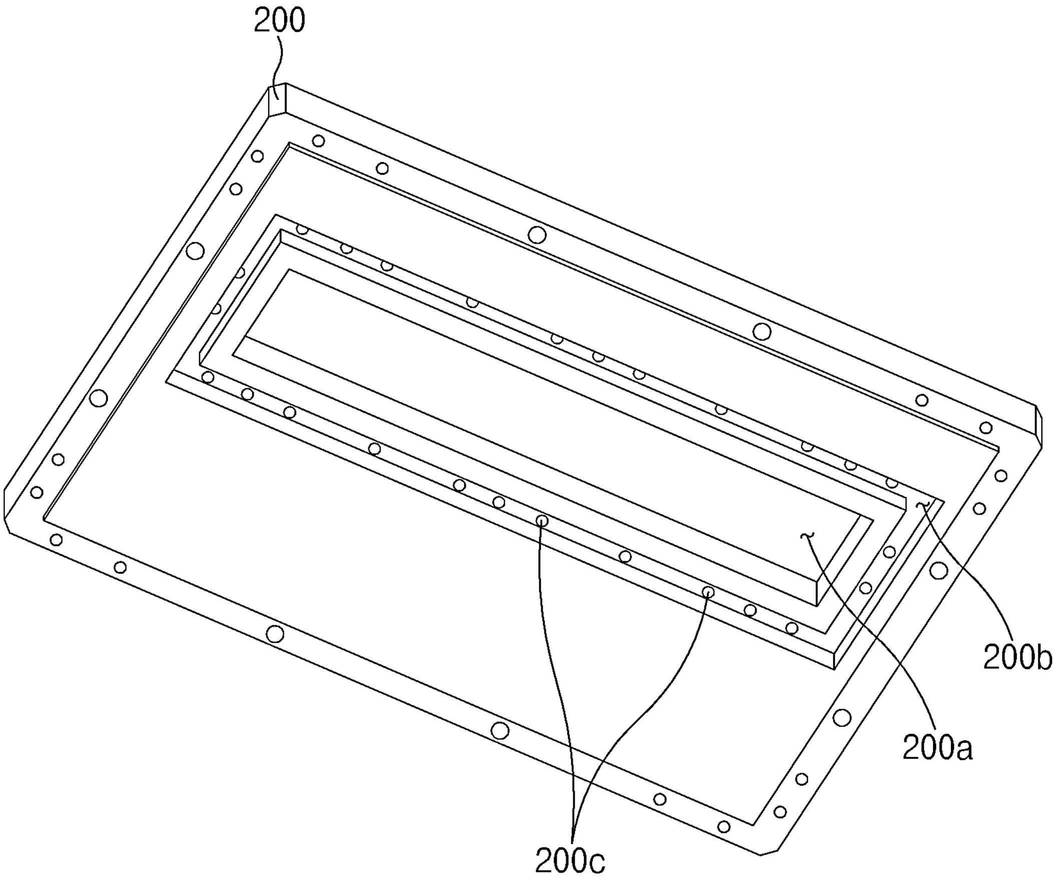
FIG. 6 is a bottom perspective view illustrating a first stripper of the pouch molding apparatus according to Embodiment 1 of the present invention.
Figure 7:
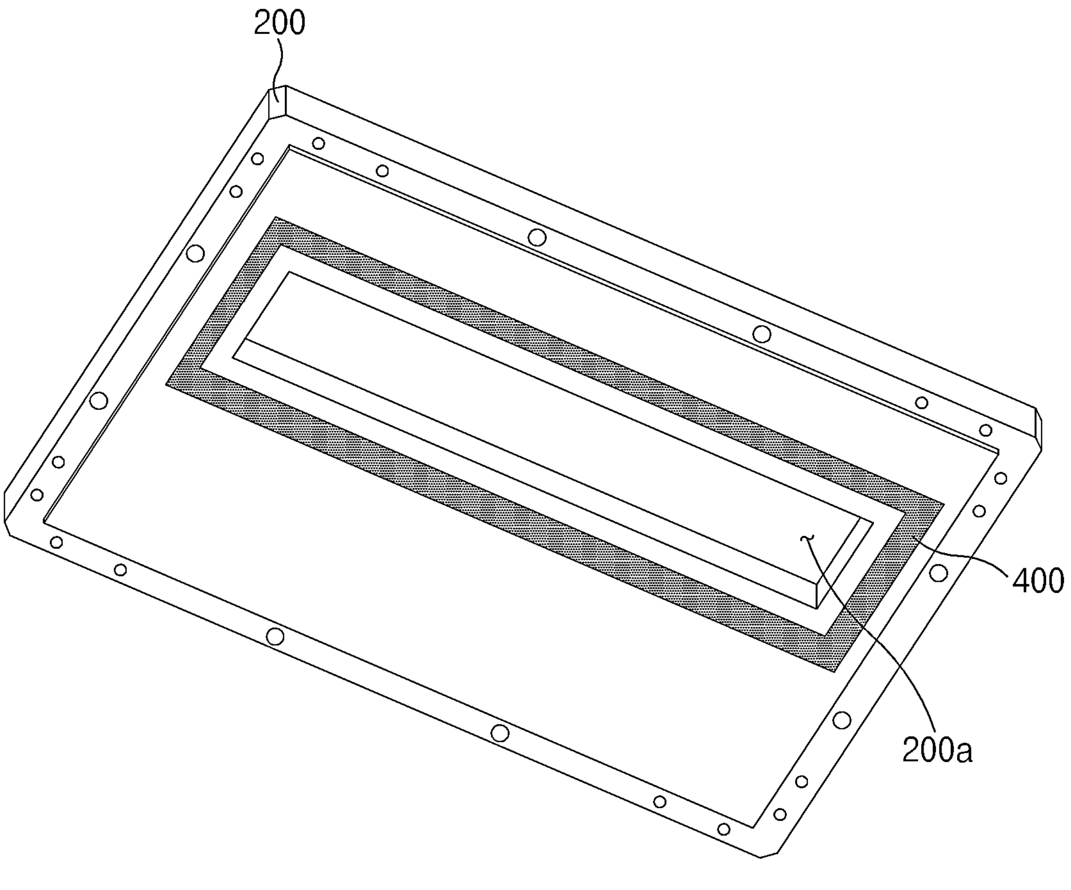
FIG. 7 is a bottom perspective view illustrating first and second strippers of the pouch molding apparatus according to Embodiment 1 of the present invention.
Figure 8:
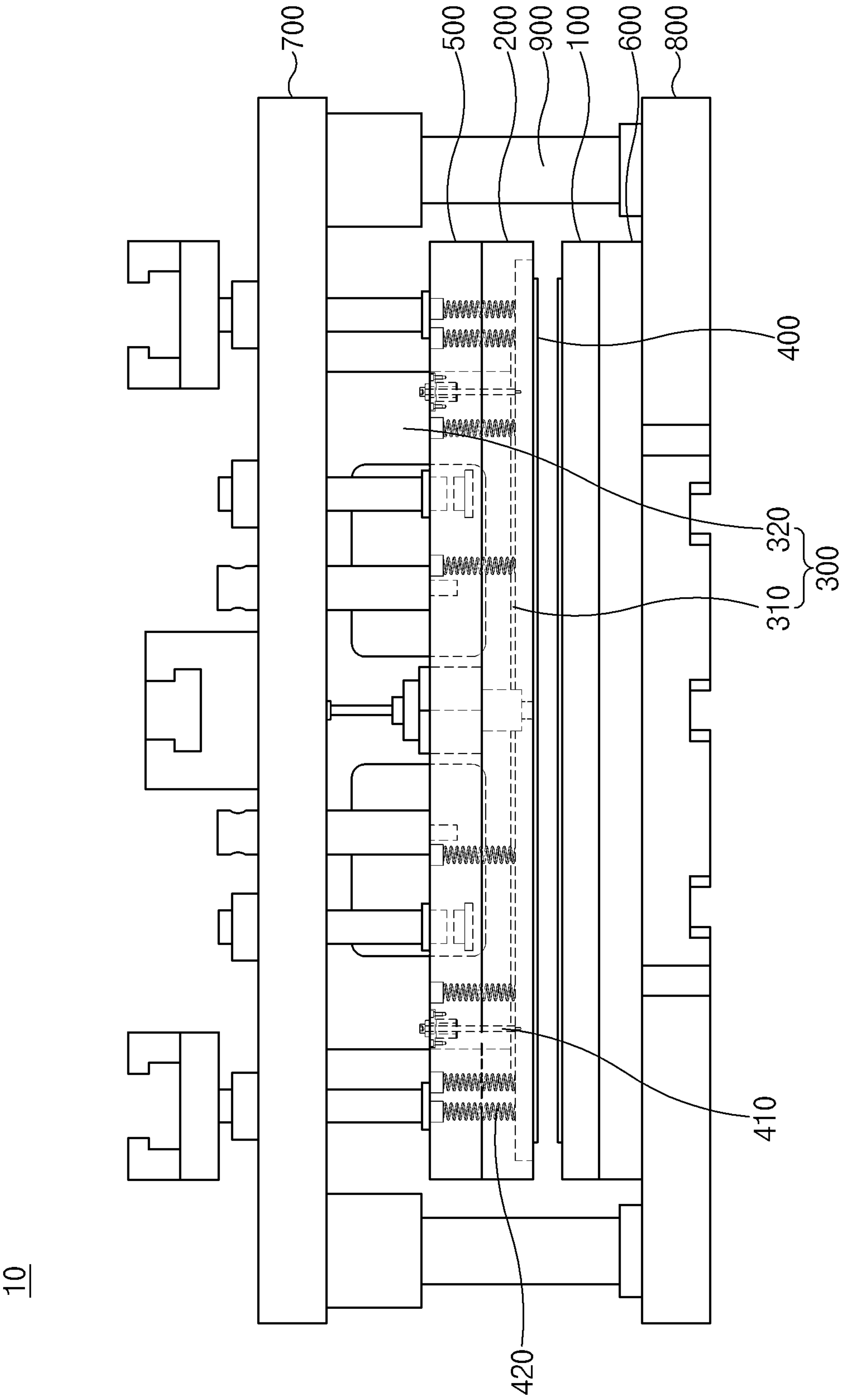
FIG. 8 is a side view illustrating the first stripper and a stripper back plate in the pouch molding apparatus according to Embodiment 1 of the present invention.
Figure 9:
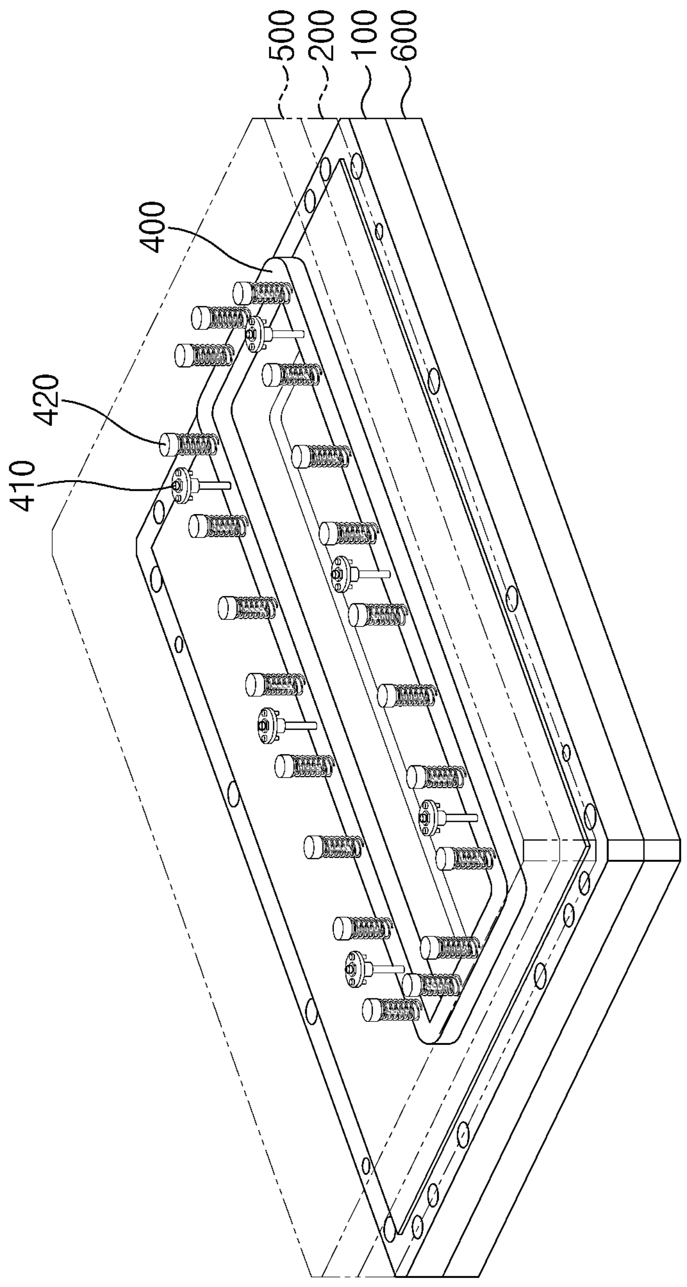
FIG. 9 is a transparent perspective view illustrating the first stripper and the stripper back plate of some of the constituents of the pouch molding apparatus according to Embodiment 1 of the present invention.

FIG. 3 is a perspective view of a pouch molding apparatus according to Embodiment 1 of the present invention. FIG. 4 is a side view of the pouch molding apparatus according to Embodiment 1 of the present invention. FIG. 5 is an exploded perspective view illustrating some constituents of the pouch molding apparatus according to Embodiment 1 of the present invention. FIG. 6 is a bottom perspective view illustrating a first stripper of the pouch molding apparatus according to Embodiment 1 of the present invention. FIG. 7 is a bottom perspective view illustrating first and second strippers of the pouch molding apparatus according to Embodiment 1 of the present invention. FIG. 8 is a side view illustrating the first stripper and a stripper back plate in the pouch molding apparatus according to Embodiment 1 of the present invention. FIG. 9 is a transparent perspective view illustrating the first stripper and the stripper back plate of some of the constituents of the pouch molding apparatus according to Embodiment 1 of the present invention.

Referring to FIGS. 3 to 5, a pouch molding apparatus 10 according to the present embodiment includes a die plate 100, a first stripper 200, a punch part 300, and a second stripper 400.

First, the die plate 100 is formed in a flat plate shape so that a pouch film is seated thereon, and a cup part molding hole 100*a* passing through top and bottom surfaces is formed in the die plate 100. That is, in a state in which the pouch film is seated on an upper portion of the die plate 100, the punch part 300 to be described later passes through a cup part molding hole 100*a* to mold a cup part of a pouch. Thus, the die plate 100 serves to support or fix the pouch film from a lower side. The die plate 100 may be formed in a flat plate shape to support or fix the pouch film so that a uniform surface pressure is applied to the pouch film seated on the die plate 100.

The first stripper 200 presses the pouch film from the upper side of the die plate 100 to fix the pouch film, and a punch hole 200*a* passing through the top and bottom surfaces is formed at a position corresponding to the cup part molding hole 100*a*. That is, the pouch film may be supported by the die plate 100 from a lower side and be pressed and fixed by the first stripper 200 from an upper side. It is unnecessary that the pouch film is seated on the upper portion of the die plate 100, and the first stripper 200 presses and fixes the pouch film from the upper side of the die plate 100. On the contrary, the pouch film may be seated on the upper portion of the first stripper 200, and the die plate 100 may press and fix the pouch film from the upper side of the first stripper 200.

The punch part 300 is drawn in and out of the punch hole 200*a* of the first stripper 200 and the cup part molding hole 100*a* of the die plate 100 to mold the pouch film. Here, the punch part 300 is first inserted into the punch hole 200*a* of the first stripper 200 and then inserted into the cup part molding hole 100*a* of the die plate 100 to press the pouch film, thereby molding the cup part. When the cup part is completely molded, the punch part 300 may be drawn out of the cup part molding hole 100*a* of the die plate 100 and then drawn out of the punch hole 200*a* of the first stripper 200.

The second stripper 400 is provided to protrude from a bottom surface of the first stripper 200 and is provided along a circumference of the punch hole 200*a* to press and fix the pouch film. As a result, the second stripper 400 may uniformly and strongly press the pouch film around a cup part molding position of the pouch film to minimize an occurrence of wrinkles around the cup part, prevent cracks or fractures, which may occur due to the wrinkles, and improve molding quality, thereby achieving space efficiency of the cup part and maximizing energy density.

Hereinafter, each of the components of the pouch molding apparatus 10 according to the present embodiment will be described in more detail.

Referring to FIGS. 5 and 7, the second stripper 400 may be formed in a ring shape having an inner circumference and an outer circumference, and the inner circumference may be formed to be greater than a circumference of the punch hole 200*a*. Since the second stripper 400 is provided along the circumference of the punch hole 200*a*, when the inner circumference is formed to be less than the circumference of the punch hole 200*a*, the second stripper 400 may interfere with the punch part 300 passing through the punch hole 200*a* of the first stripper 200, and thus, movement of the second stripper 400 may occur, or punching of the punch part 300 may not properly performed to deteriorate the molding quality of the pouch cup part. Thus, the inner circumference of the second stripper 400 is formed to be greater than the circumference of the punch hole 200*a*, and thus, the second stripper 400 may not interfere with the punch part 300 and may press uniformly and effectively the pouch film.

A friction coating layer may be formed on a surface of the second stripper 400, which face the die plate 100. Since the pouch film is seated on the die plate 100, the surface facing the die plate 100 in the second stripper 400 may be understood as the same as the pressure surface on which the second stripper 400 presses the pouch film. As described above, the friction coating layer is formed on the surface of the second stripper 400, which faces the die plate 100, and thus, the frictional force between the second stripper 400 and the pouch film may increase. As a result, since the second stripper 400 more uniformly and strongly press the pouch film, an occurrence of wrinkles around the cup part molding position may be suppressed.

The friction coating layer may include a material capable of increasing in frictional force between the second stripper 400 and the pouch film and may preferably include silicone. However, it is not necessarily limited to silicon. For example, a material having no concern of physically and chemically reacting with the pouch film and having frictional coefficient greater than that of the second stripper 400 may be selected as the friction coating layer. In addition to the material having a large frictional coefficient in addition to a specific material, the frictional coefficient may increase by varying in shape or roughness of the surface.

Referring to FIGS. 5 and 6, the first stripper 200 may be formed along the circumference of the punch hole 200*a* and may have an insertion groove 200*b* having a shape that is recessed upward from the lower side. The shape recessed upward from the lower side may be understood as the same as a shape recessed from one surface to the other surface of the first stripper 200 having a thickness. However, here, the one surface may be a surface of the first stripper 200, which is provided with the second stripper 400, and the other surface may be a surface that is opposite to the one side of the first stripper 200. As described above, the insertion groove 200*b* is formed in the first stripper 200. Thus, as described below, the second stripper 400 may be drawn in or out of the insertion groove 200*b*, and thus, pressing force of the second stripper 400 may be appropriately adjusted.

Continuously, referring to FIGS. 6 to 8, the insertion groove 200*b* may be formed to have a horizontal cross-section having a shape corresponding to that of a horizontal cross-section of the second stripper 400, and the second stripper 400 may be provided to protrude from the bottom surface of the first stripper 200 and may be drawn in or out of the insertion groove 200*b* so as to be vertically movable. The insertion groove 200*b* may provide a space in which the second stripper 400 is drawn in or out of the first stripper 200, and for this, the insertion groove 200*b* may have a shape corresponding to the horizontal cross-section of the second stripper 400. Here, that the insertion groove 200*b* has the shape corresponding to the horizontal cross-section of the second stripper 400 may mean that the insertion groove 200*b* has a shape in which the insertion groove 200*b* has the same size as the horizontal cross-section of the second stripper 400, but has a width that is as large as a size of an offset. If the size of the width of the insertion groove 200*b* is the same as the size of the width of the second stripper 400, the second stripper 400 may not be inserted into the insertion groove (200*b*), or even if the second stripper 400 is inserted into the insertion groove 200*b*, movement may not be smooth due to an interference by a pressure, and as a result, it is impossible to apply appropriate pressing force. Conversely, if the width of the insertion groove 200*b* is excessively larger than the width of the second stripper 400, when the second stripper 400 presses the pouch film while the second stripper 400 is inserted into the insertion groove 200*b*, movement in a lateral direction may occur, and thus, it is impossible to apply appropriate pressing force. Therefore, it is preferable that the size of the offset is an appropriate with at which the second stripper 400 is easily inserted into the insertion groove 200*b*, and after the insertion, movement of the second stripper 400 does not occur in the insertion groove 200*b*. In fact, the size of the offset may be experimentally determined according to the width of the second stripper 400 to be manufactured.

As described above, the second stripper 400 may be provided in a state of protruding from the bottom surface of the first stripper 200 and may be partially inserted into the insertion groove 200*b* as the second stripper 400 presses the pouch film. As a result, the pouch film may be appropriately pressed to suppress the occurrence of the wrinkles, and also, the shape of the second stripper 400 may not remain around the cup part molding position to improve the molding quality.

Referring to FIG. 8, the pouch molding apparatus 10 according to the present embodiment may further include an upper plate 700 and a lower plate 800. The upper plate 700 may be provided above the first stripper 200, and the lower plate 800 may be provided below the die plate 100. Here, the upper plate 700 and the lower plate 800 may be coupled to each other at an edge by a coupling member 900 having a length in a vertical direction. That is, the upper plate 700 is provided at an upper end of the pouch molding apparatus 10, and the punch part 300 and the configuration of the stripper back plate 500 described later may be coupled to be fixed. The lower plate 800 may be provided at the lower end of the pouch molding apparatus 10 to serve to support the entire pouch molding apparatus 10 from the lower side.

In addition, the pouch molding apparatus 10 may further include a stripper back plate 500 and a die back plate 600. The stripper back plate 500 is provided between the first stripper 200 and the upper plate 700 to fix at least one of the first stripper 200 or the second stripper 400. The die back plate 600 is provided between the lower plate 800 and the die plate 100 to support the die plate 100 from the lower side. As described above, the first stripper 200, the second stripper 400, and the die plate 100 may be in direct contact with the pouch film to serve to press the pouch film, and the stripper back plate 500 and the die back plate 600 may be provided above or below the stripper, and thus, the first and second strippers and the die plate 100 may be stably fixed to the pouch molding apparatus 10.

Hereinafter, a method for fixing a second stripper 400 will be described in detail with reference to FIGS. 6, 8 and 9.

First, as illustrated in FIG. 6, a punch hole 200*a* may be formed along a circumference of a first stripper 200, and a through-hole 200*c* passing through top and bottom surfaces of the first stripper 200 may be formed in the first stripper 200. Here, as illustrated in FIGS. 8 and 9, a second stripper 400 may be fixed to the stripper back plate 500 by a fixing member 410 passing through the through-hole 200*c*. As described above, even if the second stripper 400 is provided below the first stripper 200 or inside the insertion groove 200*b* of the first stripper 200, the second stripper 400 may not be in direct contact with the first stripper 200, but be fixed to the stripper back plate 500 so as to be independently movable in the vertical direction with respect to the first stripper 200, thereby applying appropriate pressing force to the pouch film. Here, the through-hole 200*c* may be formed in plurality, and the fixing member 410 may also be formed in plurality. However, the number of through-holes 200*c* may be the same or less than the number of through-holes 200*c* to fix the second stripper 400.

The fixing member 410 may be provided in a stopper manner in which a length is changed, but not changed to a predetermined length or less or a predetermined length or more, but is fixed. Here, the meaning of being fixed without changed to the predetermined length or more may mean that the second stripper 400 is fixed to protrude from a bottom surface of the first stripper 200, and also, the second stripper 400 is not changed to a length or more at which the second stripper 400 is fixed to protrude so as not to seat the pouch film between the die plate 100 and the first stripper 200. In addition, the meaning of being fixed without changed to the predetermined length or less may mean that the second stripper 400 is inserted into the insertion groove 200*b* formed in the first stripper, and also, the second stripper 400 is completely inserted into the insertion groove 200*b* and is not changed to a length or less at which the second stripper 400 does not protrude.

The second stripper 400 may adjust pressing force of pressing the pouch film by a pressing force adjusting member provided to pass through the through-hole 200*c* in addition to the above fixing member 410. The pressing force adjusting member 420 is provided separately with respect to the fixing member 410, and the second stripper 400 applies force in a direction opposite to the direction in which the first stripper 200 is inserted into the insertion groove 200*b* so that the second stripper 400 provides pressing force to press the pouch film. Therefore, the pressing force adjusting member 420 may continuously increase in pressing force of the second stripper 400 as the second stripper 400 is inserted into the insertion groove 200*b*. One side of the pressing force adjusting member 420 may be provided to be in contact with the second stripper 400, and the other side may be provided to be coupled to the stripper back plate 500. The pressing force adjusting member 420 may also be formed in plurality to adjust the pressing force for each position.

The pressing force adjusting member 420 may include a spring having elasticity in a longitudinal direction. Since elastic force increases as the spring is pressed, when the spring is selected as the pressing force adjusting member 420, the pressing force of the second stripper 400 may continuously increase so that the second stripper 400 is inserted into the insertion groove 200*b*. The pressing force adjusting member 420 may further include a spring fixing member for fixing the other side of the spring to the stripper back plate 500 in addition to the spring.

Next, the punch part 300 may include a punch body 320 and a punch 310 that is provided under the punch body 320 and has a pressing surface for pressing the pouch film. The punch body 320 may be configured to fix the punch part 300 to the pouch molding apparatus 10, and the punch 310 having the pressing surface may have a shape and size of a cup part to be molded as a component that directly presses the pouch film.

When the punch body 320 is fixed and does not move in the pouch molding apparatus 10 and moves vertically in a state in which the pouch film interposed between the die plate 100 and the first stripper 200, the cup part may be molded on the pouch film while the punch body 320 and the punch 310 of the punch part 300 pass through a punch hole 200*a* and a cup part molding hole 100*a*. However, on the other hand, the die plate 100 and the first stripper 200 may be fixed with the pouch film interposed therebetween, and the punch part 300 may move to mold the cup part.

Embodiment 2

Embodiment 2 of the present invention is different from Embodiment 1 in that the pressing force adjusting member 420 according to Embodiment 1 is provided so that one side thereof is in contact with the second stripper 400, and the other side thereof is provided to be coupled to the upper plate 700. The contents that are duplicated with Embodiment 1 will be omitted as much as possible, and Embodiment 2 will be described with a focus on the differences. That is, it is obvious that the contents that are not described in Embodiment 2 may be regarded as the contents of Embodiment 1 if necessary.

Figure 10:
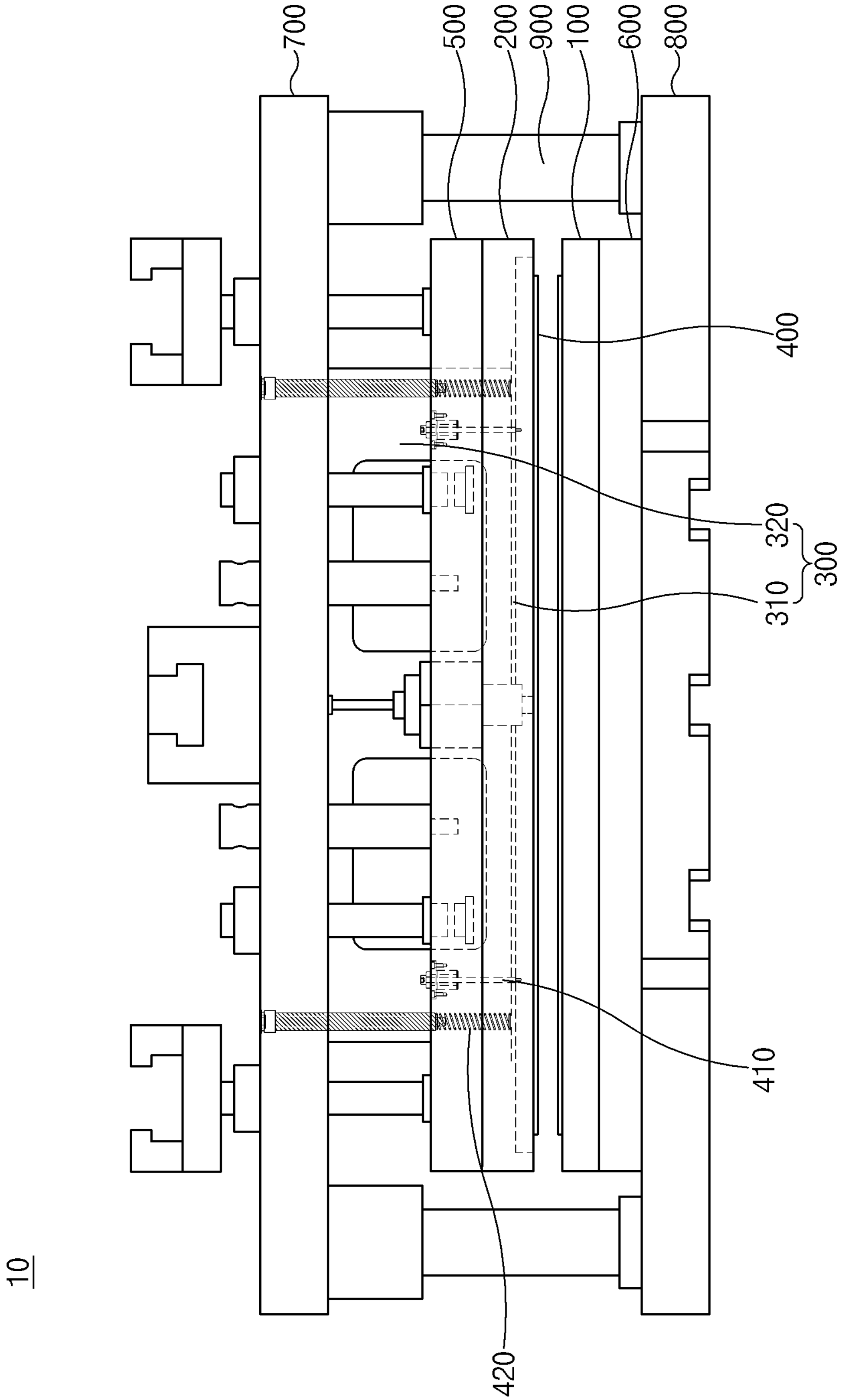
FIG. 10 is a transparent perspective view illustrating a first stripper and a stripper back plate in a pouch molding apparatus according to Embodiment 2 of the present invention.

FIG. 10 is a transparent perspective view illustrating a first stripper and a stripper back plate in a pouch molding apparatus according to Embodiment 2 of the present invention.

In a pouch molding apparatus 10 according to Embodiment 2 of the present invention, the pouch molding apparatus 10 includes a die plate 100, a first stripper 200, a punch part 300, and a second stripper 400. In addition, the pouch molding apparatus 10 may further include a stripper back plate 500, a die back plate 600, an upper plate 700, and a lower plate 800.

The first stripper 200 may be formed along a circumference of a punch hole 200*a*, a through-hole 200*c* passing through top and bottom surfaces may be formed, and the second stripper 400 may be fixed to the striper back plate 500 by a fixing member 410 provided to pass through the through-hole 200*c*.

In addition, in the second stripper 400, pouch film pressing force may be adjusted by a pressing force adjusting member 420 provided through the through-hole 200*c*. Here, the pressing force adjusting member 420 of the pouch molding apparatus 10 according to Embodiment 2 of the present invention may be provided to have one side that is in contact with the second stripper 400 and the other side coupled to the upper plate 700.

As described above, the other side of the pressing force adjusting member 420 may be coupled to the upper plate 700, and thus, the pressing force may be provided more stably compared to a case of being coupled to the stripper back plate 420. When the pressing force adjusting member 420 includes a spring, a length of the spring is formed to be elongated, and thus, pressing force having more various intensities may be provided. The pressing force adjusting member 420 may further include a spring fixing member for fixing the other side of the spring to the stripper back plate 500 in addition to the spring.

Embodiment 3

Example 3 of the present invention is different from Embodiments 1 and 2 in that the first and second strippers 400 according to Embodiments 1 and 2 are fixed by a fixing member 410, i.e., is not fixed to a stripper back plate 500, but fixed to an upper plate 700. The contents that are duplicated with Embodiments 1 and 2 will be omitted as much as possible, and Embodiment 3 will be described with a focus on the differences. That is, it is obvious that the contents that are not described in Embodiment 3 may be regarded as the contents of Embodiments 1 and 2 if necessary.

Therefore, the pouch molding apparatus 10 according to Embodiment 3 of the present invention includes a die plate 100, a first stripper 200, a punch part 300, and a second stripper 400. In addition, the pouch molding apparatus 10 may further include a die back plate 600, an upper plate 700 and a lower plate 800.

In the pouch molding apparatus 10 according to the third embodiment of the present invention, the first stripper 200 may be formed along a circumference of a punch hole 200*a*, a through-hole 200*c* passing through top and bottom surfaces may be formed, and the second stripper 400 may be fixed to the upper plate 700 by a fixing member 410 provided to pass through the through-hole 200*c*. Therefore, a structure of the pouch molding apparatus may be simplified while maintaining molding quality of the pouch.

The fixing member 410 may be provided in a stopper manner in which a length is changed, but not changed to a predetermined length or less or a predetermined length or more, but is fixed. In addition, the second stripper 400 may adjust pouch film pressing force by a pressing force adjusting member provided to pass through the through-hole 200*c*. Here, the detailed configurations of the fixing member 410 and the pressing force adjusting member 420 and the resulting effect may be understood as the same as in Embodiment 1.

In addition, in the second stripper 400, pouch film pressing force may be adjusted by a pressing force adjusting member 420 provided through the through-hole 200*c*. Here, the pressing force adjusting member 420 may be provided to have one side that is in contact with the second stripper 400 and the other side coupled to the upper plate 700.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Pouch molding apparatus
100: Die plate
100*a*: Cup part molding hole
200: First stripper
200*a*: Punch hole
200*b*: Insertion groove
200*c*: Through-hole
300: Punch part
310: Punch
320: Punch body
400: Second stripper

410: Fixing member
420: Pressing force adjusting member
500: Stripper back plate
600: Die back plate
700: Upper plate
800: Lower plate
900: Coupling member

The invention claimed is:

1. A pouch molding apparatus comprising:

a die plate having a molding hole passing through top and bottom surfaces of the die plate, wherein the die plate is configured to seat a pouch film on an upper portion of the die plate;

a first stripper having a punch hole with a position corresponding to the molding hole, wherein the first stripper is configured to press and affix the pouch film to an upper side of the die plate;

a punch part configured to be drawn in and out of the punch hole and the molding hole to mold the pouch film; and a second stripper configured to protrude from a bottom surface of the first stripper along a circumference of the punch hole to press and affix the pouch film.

2. The apparatus of claim 1, wherein the second stripper has a ring shape having an inner circumference and an outer circumference, wherein the inner circumference is greater than the circumference of the punch hole.

3. The apparatus of claim 1, wherein the second stripper further includes a friction coating layer on a surface facing the die plate.

4. The apparatus of claim 3, wherein the friction coating layer comprises silicone.

5. The apparatus of claim 1, wherein the first stripper further includes an insertion groove therein that is recessed upward from a lower portion of the first stripper, wherein the first stripper is formed along a circumference of the punch hole.

6. The apparatus of claim 5, wherein the insertion groove has a horizontal cross-section corresponding to a horizontal cross-section of the second stripper, wherein the second stripper is configured to be drawn in or out of the insertion groove so as to be vertically movable.

7. The apparatus of claim 1, further comprising:

an upper plate positioned above the first stripper; and a lower plate positioned below the die plate, wherein the upper plate and the lower plate are coupled to each other at a respective edge thereof by a coupling member that extends vertically.

8. The apparatus of claim 7, further comprising:

a stripper back plate positioned between the first stripper and the upper plate to affix at least one of the first stripper or the second stripper; and a die back plate positioned between the lower plate and the die plate to support the die plate from a lower side.

9. The apparatus of claim 8, wherein the first stripper is formed along a circumference of the punch hole, and the second stripper is affixed to the stripper back plate by a fixing member configured to pass through a through-hole in the first stripper.

10. The apparatus of claim 9, wherein the fixing member is configured to fix a location of the second stripper while the fixing member has an adjustable length.

11. The apparatus of claim 9, wherein, in the second stripper, a pouch film pressing force is adjusted by a pressing force adjusting member configured to pass through the through-hole.

12. The apparatus of claim 11, wherein the pressing force adjusting member comprises a spring having elasticity in a longitudinal direction.

13. The apparatus of claim 11, wherein the pressing force adjusting member is configured to have one end in contact with the second stripper and the other end coupled to the stripper back plate.

14. The apparatus of claim 11, wherein the pressing force adjusting member is provided to have one end in contact with the second stripper and the other end coupled to the upper plate.

15. The apparatus of claim 1, wherein the punch part comprises:

a punch body; and a punch provided below the punch body and having a pressing surface configured to press the pouch film.

16. The apparatus of claim 7, wherein the first stripper is formed along a circumference of the punch hole, wherein the second stripper is fixed to the upper plate by a fixing member configured to pass through a through-hole in the first stripper.

17. The apparatus of claim 16, wherein, in the second stripper, a pouch film pressing force is adjusted by a pressing force adjusting member configured to pass through the through-hole, and the pressing force adjusting member is configured to have one end in contact with the second stripper and the other end coupled to the upper plate.

* * * * *